US012659715B2

(12) United States Patent
Hoffner et al.

(10) Patent No.: US 12,659,715 B2
(45) Date of Patent: Jun. 16, 2026

(54) SYSTEMS AND METHODS FOR ESTABLISHING PROTOCOL DATA UNIT SESSIONS USING SESSION MANAGEMENT SUBSCRIPTION DATA

(71) Applicant: Verizon Patent and Licensing Inc., Basking Ridge, NJ (US)

(72) Inventors: Barry F. Hoffner, Bridgewater, NJ (US); James Mathison, Greer, SC (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 585 days.

(21) Appl. No.: 18/153,074

(22) Filed: Jan. 11, 2023

(65) Prior Publication Data
US 2024/0236640 A1     Jul. 11, 2024

(51) Int. Cl.
*H04W 8/18*      (2009.01)
*H04L 65/1016*   (2022.01)

(52) U.S. Cl.
CPC ........... *H04W 8/18* (2013.01); *H04L 65/1016* (2013.01)

(58) Field of Classification Search
CPC .. H04L 65/1016; H04L 65/1073; H04W 8/18; H04W 8/20
See application file for complete search history.

(56) References Cited

U.S. PATENT DOCUMENTS

2020/0351409  A1*  11/2020  Karampatsis ......... H04W 76/30

* cited by examiner

*Primary Examiner* — Diane D Mizrahi

(57) ABSTRACT

In some implementations, a session management function (SMF) may receive, from an access and mobility management function (AMF), an SMF protocol data unit (PDU) session message that indicates a plurality of data network names (DNNs) capable of being handled by the SMF for a subscription permanent identifier (SUPI. The SMF may transmit, to a unified data management (UDM) or a unified data repository (UDR), a subscriber profile retrieval message for requesting session management subscription data for the plurality of DNNs. The SMF may receive, from the UDM or the UDR, an acknowledgement message that indicates the session management subscription data for the plurality of DNNs. The SMF may store the session management subscription data for the plurality of DNNs.

20 Claims, 5 Drawing Sheets

400

```
410 ─┐ Receive, by a session management function (SMF) from an access
     │ and mobility management function (AMF), a protocol data unit (PDU)
     │ session message that indicates a plurality of data network names
     │ (DNNs) capable of being handled by the SMF for a subscription
     │ permanent identifier (SUPI)

420 ─┐ Transmit, by the SMF to a unified data management (UDM) or a
     │ unified data repository (UDR), a subscriber profile retrieval message
     │ for requesting session management subscription data for the plurality
     │ of DNNs 430 ─┐ Receive, by the SMF and from the UDM or the UDR, an
     │ acknowledgement message that indicates the session management
     │ subscription data for the plurality of DNNs 440 ─┐ Store, by the SMF, the session management subscription data for the
     │ plurality of DNNs, wherein the session management subscription
     │ data is stored for future PDU sessions associated with one or more
     │ DNNs of the plurality of DNNs
```

100

200

300

Bus
310

Processor
320

Memory
330

Input
Component
340

Output
Component
350

Communication
Component
360

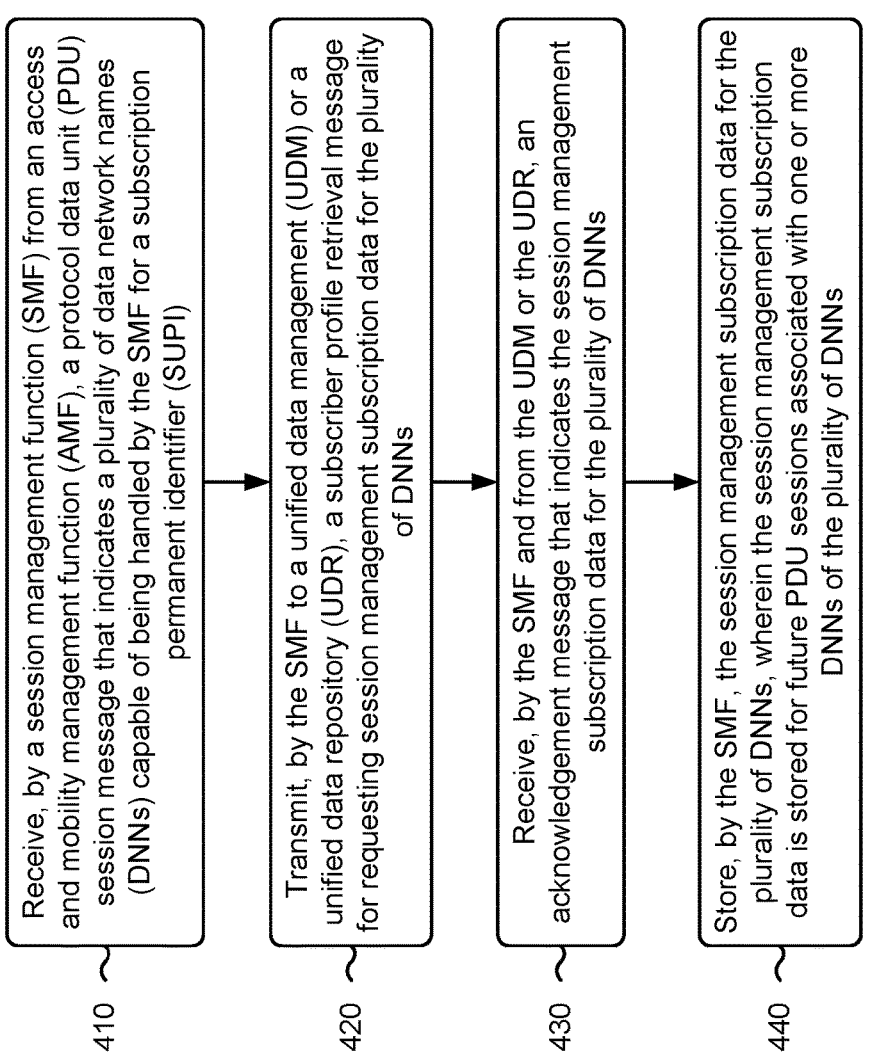

Receive, by a session management function (SMF) from an access and mobility management function (AMF), a protocol data unit (PDU) session message that indicates a plurality of data network names (DNNs) capable of being handled by the SMF for a subscription permanent identifier (SUPI)

410

Transmit, by the SMF to a unified data management (UDM) or a unified data repository (UDR), a subscriber profile retrieval message for requesting session management subscription data for the plurality of DNNs

420

Receive, by the SMF and from the UDM or the UDR, an acknowledgement message that indicates the session management subscription data for the plurality of DNNs

430

Store, by the SMF, the session management subscription data for the plurality of DNNs, wherein the session management subscription data is stored for future PDU sessions associated with one or more DNNs of the plurality of DNNs

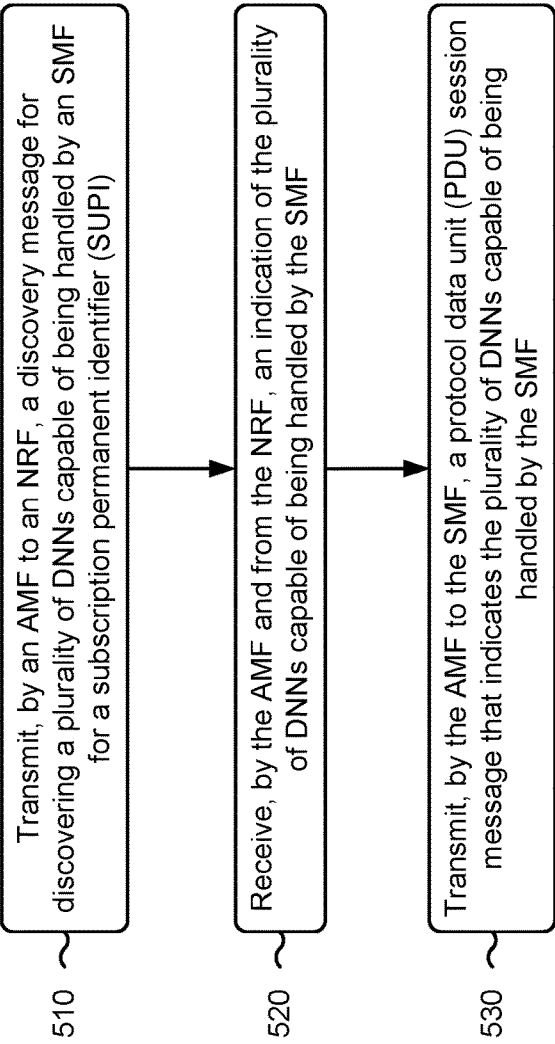

510 — Transmit, by an AMF to an NRF, a discovery message for discovering a plurality of DNNs capable of being handled by an SMF for a subscription permanent identifier (SUPI)

520 — Receive, by the AMF and from the NRF, an indication of the plurality of DNNs capable of being handled by the SMF 530 — Transmit, by the AMF to the SMF, a protocol data unit (PDU) session message that indicates the plurality of DNNs capable of being handled by the SMF

FIG. 5

SYSTEMS AND METHODS FOR ESTABLISHING PROTOCOL DATA UNIT SESSIONS USING SESSION MANAGEMENT SUBSCRIPTION DATA

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications. "Downlink" (or "DL") refers to a communication link from the network node to the UE, and "uplink" (or "UL") refers to a communication link from the UE to the network node. Often the signaling between network components may induce latency in the network.

BRIEF DESCRIPTION OF THE DRAWINGS

FIGS. 4-5 are flowcharts of example processes associated with establishing PDU sessions using session management subscription data.

DETAILED DESCRIPTION OF EXAMPLE EMBODIMENTS

Figure 1:
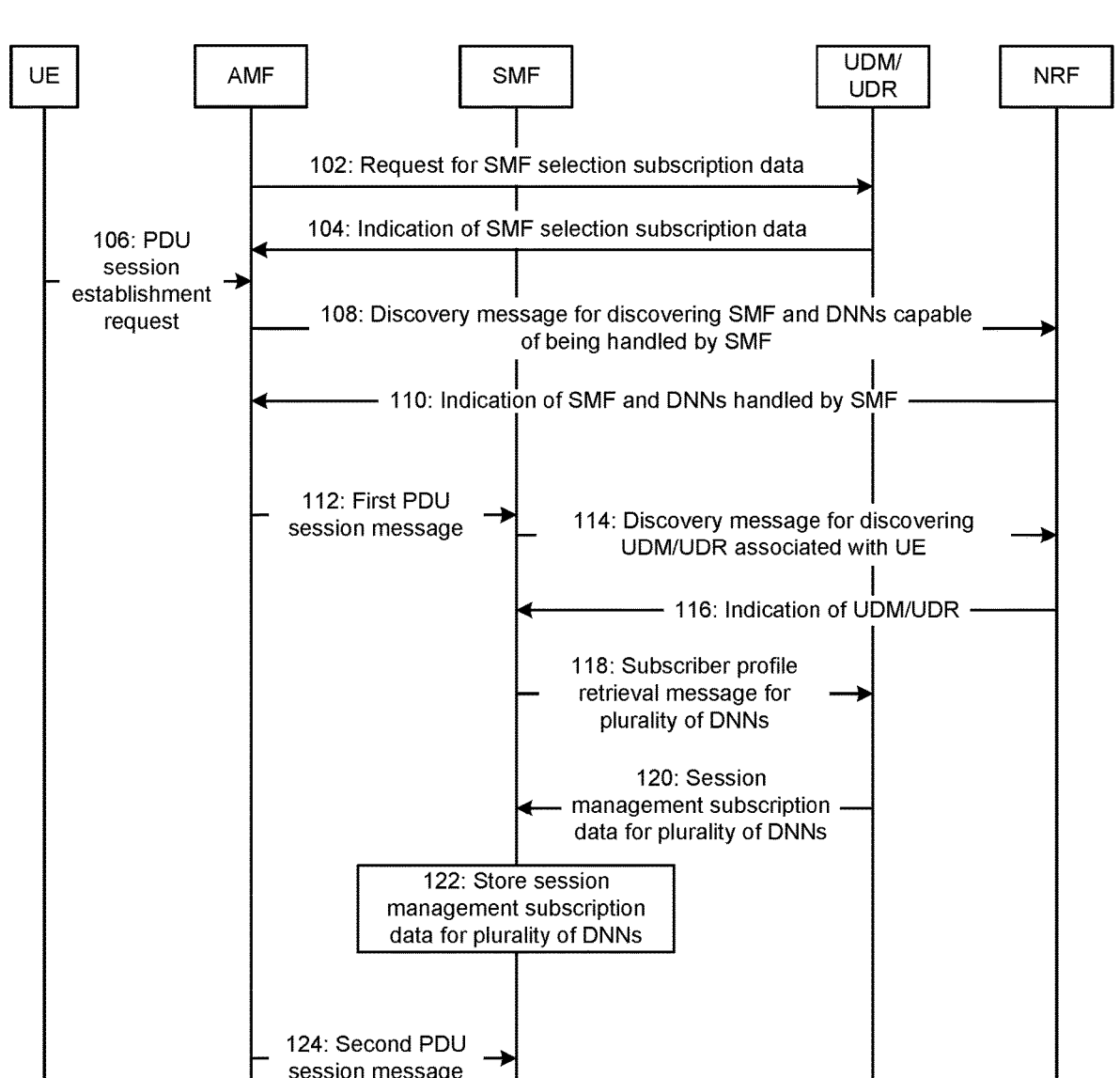
FIG. 1 is a diagram of an example associated with establishing PDU sessions using session management subscription data.

The following detailed description of example implementations refers to the accompanying drawings. The same reference numbers in different drawings may identify the same or similar elements.

In a wireless communication system, a protocol data unit (PDU) session may provide end-to-end connectivity between a user equipment (UE) and a specific data network. A PDU session may support one or more quality of service (QoS) flows. The UE may transmit a PDU session establishment request in order to establish the PDU session. The PDU session may be for internet protocol multimedia subsystem (IMS), which may support voice and text messaging services. The PDU session for IMS may be associated with an IMS data network name (DNN). The PDU session for IMS may be a default PDU session for the UE. The UE may transmit additional PDU session establishment requests to establish additional PDU sessions, which may run in parallel with the PDU session for IMS. The additional PDU sessions may include a PDU session for internet, and other examples. The PDU session for internet may be associated with an internet DNN. Data for each PDU session may be segregated and may be assigned a separate QoS flow.

A PDU session setup may be associated with a PDU session setup time. A longer PDU session setup time may be associated with a longer latency and a reduced user experience, whereas a shorter PDU session setup time may be associated with a shorter latency and an improved user experience. Since the UE may have multiple PDU sessions in parallel, the PDU session setup may be repeated for each individual PDU session. During each PDU session setup, a session management function (SMF) may transmit a request to a unified data management (UDM) or a unified data repository (UDR) (UDM/UDR) in order to receive session management subscription data from the UDM/UDR. The session management subscription data may be associated with a particular PDU session. For example, during the PDU session setup for IMS, the SMF may transmit a request to the UDM/UDR to receive session management subscription data specific to the IMS. During the PDU session setup for internet, which may occur after the PDU session setup for IMS, the SMF may transmit a request to the UDM/UDR to receive session management subscription data specific to the internet. In other words, the SMF may need to transmit multiple requests to the UDM/UDR, and the UDM/UDR may need to transmit multiple responses to the SMF, which may increase signaling overhead. Such an approach is inefficient and adds latency for each PDU session setup.

When creating the PDU session for IMS, the SMF may retrieve the session management subscription data of an IMS DNN. During the PDU session setup for IMS, the SMF may pull the session management subscription data for only the IMS DNN. When creating the PDU session for internet, which may occur relatively soon after the PDU session for IMS, the SMF may need to retrieve the session management subscription data of an internet DNN. During the PDU session setup for internet, the SMF may pull the session management subscription data for only the internet DNN. When creating another PDU session (e.g., for another DNN, such as an administrator DNN, an internal application DNN, a gaming DNN, a low latency application DNN, or an enterprise DNN), the SMF may need to retrieve appropriate session management subscription data. In other words, each time another PDU session is established, the SMF may again need to request appropriate session management subscription data from the UDM/UDR, which may increase a signaling overhead.

In some implementations described in the present disclosure, an SMF may receive, from an access and mobility management function (AMF), a first PDU session message. The first PDU session message may be for establishing a first PDU session for IMS. The PDU session message may indicate a plurality of DNNs capable of being handled by the SMF. The plurality of DNNs may include an IMS DNN, an internet DNN, an administrator DNN, an internal application DNN, a gaming DNN, a low latency application DNN, and/or an enterprise DNN. The SMF may transmit, to a UDM/UDR, a subscriber profile retrieval message for requesting session management subscription data for the plurality of DNNs. The SMF may receive an indication of the UDM/UDR from a network repository function (NRF), and the SMF may transmit the subscriber profile retrieval message to the UDM/UDR based on the indication received from the NRF. The SMF may receive, from the UDM/UDR, an acknowledgement message that indicates the session management subscription data for the plurality of DNNs. For example, the SMF may receive, from the UDM/UDR, session management subscription data for the IMS, session management subscription data for the internet, and so on. The SMF may store the session management subscription data for the plurality of DNNs locally at the SMF. The session management subscription data may be stored for future PDU sessions. The first PDU session for IMS may be established based on the session management subscription data for the IMS.

In some implementations, at a later time, the SMF may receive, from the AMF, a second PDU session message. The second PDU session message may be for establishing a second PDU session for internet. The second PDU session for internet may be established based on the session management subscription data for the internet, which may already be stored by the SMF. In other words, the SMF may have pre-fetched the session management subscription data for the internet during the establishment of the first PDU session for IMS, which may avoid the SMF from having to request such information from the UDM/UDR during the establishment of the second PDU session for internet. As a result, an amount of signaling associated with the establishment of the second PDU session for internet is reduced, which reduces an overall latency.

FIG. 1 is a diagram of an example 100 associated with establishing PDU sessions using session management subscription data. As shown in FIG. 1, example 100 includes a UE (e.g., UE 210 of FIG. 2), an AMF (e.g., AMF 220 of FIG. 2), an SMF (e.g., SMF 230 of FIG. 2), a UDM/UDR (e.g., UDM/UDR 240 of FIG. 2), and an NRF (e.g., NRF 250 of FIG. 2).

As shown by reference number 102, the AMF may transmit, to the UDM/UDR, a request for SMF selection subscription data for a subscription permanent identifier (SUPI). The AMF may transmit, to the UDM/UDR, the request for SMF selection subscription data (e.g., GET ../nudm-sdm/v./{supi}/smf-select-data). The request may be a GET message. The request may indicate a SUPI. The request may indicate a need for SMF selection subscription data. The request may indicate the UDM.

As shown by reference number 104, the AMF may receive, from the UDM/UDR, an indication of the SMF selection subscription data. The indication may include one or more S-NSSAIs and corresponding DNNs. The AMF may receive, from the UDM/UDR, the indication of the SMF selection subscription data (e.g., 200 OK (SmfSelectionSubscriptionData)). The indication may be a 200 OK message. For example, the SMF selection subscription data may indicate an S-NSSAI of 1-0000007 and a corresponding DNN of IMS and internet, and an S-NSSAI of 1-0000008 and a corresponding DNN of IMS and administrator. In other words, the SMF selection subscription data may indicate that the SUPI (which may be associated with a subscriber) is allowed to use, for the S-NSSAI of 1-0000007, an IMS DNN and an internet DNN, and for the S-NSSAI of 1-0000008, the internet DNN and an administrator DNN. As a result, the AMF may be notified regarding which services are available to the SUPI. The SMF selection subscription data may be indication a combination of S-NSSAI and DNN. In other words, the DNN and the S-NSSAI may be specified together.

As shown by reference number 106, the AMF may receive, from the UE, a PDU session establishment request that indicates a DNN and a single-network slice selection assistance information (S-NSSAI). The UE may transmit the PDU session establishment request in order to initiate a voice call. The PDU session establishment request may indicate the IMS DNN and the S-NSSAI of 1-0000007.

As shown by reference number 108, the AMF may transmit, to the NRF, a discovery message for discovering the SMF and a plurality of DNNs capable of being handled by the SMF. The plurality of DNNs may refer to separate parallel networks that are used for different purposes. The plurality of DNNs may include an IMS DNN (e.g., a DNN for voice and text messaging services), an internet DNN (e.g., a DNN for data applications), an administrator DNN (e.g., a DNN for updating a subscriber identity module (SIM) or providing software updates), an internal application DNN (e.g., a DNN for applications that are exempt from data charges), a gaming DNN (e.g., a DNN for gaming applications), a low latency application DNN (e.g., a DNN for low latency applications), and/or an enterprise DNN (e.g., a DNN for company-specific secure traffic).

In some implementations, the AMF may transmit, to the NRF, the discovery message for discovering the SMF and a plurality of DNNs capable of being handled by the SMF (e.g., GET ../nnrf-disc/v./nf-instances?target-nf-type=SMF&dnn=IMS&dnn=Internet&dnn=Admin& snssai&TAI&[pgw-ind]). When multiple S-NSSAIs are allowed, the AMF may need to specify all of the allowed S-NSSAI and DNN combinations (e.g., 1-00007+ Internet, 1-00008+ Internet, and 1-0007+IMS). The S-NSSAI may be associated with a DNN and not with the UE. The AMF may check if any other potential DNNs (e.g., other potential PDU sessions) may also be handled by the SMF. The discovery message may be a GET message. The discovery message may indicate the NRF and a target type of SMF. The discovery message may indicate the plurality of DNNs, such as the IMS DNN, the internet DNN, and an administrator DNN. In some cases, the discovery message may indicate other DNN types (e.g., low latency, gaming, and so on).

As shown by reference number 110, the AMF may receive, from the NRF, an indication of the SMF and the plurality of DNNs capable of being handled by the SMF for the SUPI. In other words, based on a UE registration with the AMF, the AMF may receive information, from the NRF, regarding the SMF that is able to handle the plurality of DNNs and S-NSSAIs that are allowed for the SUPI. Some SMFs may be tailored for certain purposes (e.g., one SMF may only handle short messaging service (SMS) and another SMF may only handle internet). The AMF may determine, from the indication received from the NRF, which DNNs are supported by each SMF. The AMF may receive, from the NRF, the indication of the SMF capable of handling the plurality of DNNs (e.g., 200 OK). The indication may be a 200 OK message.

As shown by reference number 112, the AMF may transmit, to the SMF, a first PDU session message. The first PDU session message may be for establishing a first PDU session for IMS. The first PDU session message may be for establishing the IMS DNN. The first PDU session message may indicate the SUPI and the S-NSSAI. The first PDU session message may indicate the plurality of DNNs, including the IMS DNN, capable of being handled by the SMF for the SUPI. In other words, the AMF may indicate, to the SMF, the plurality of DNNs capable of being handled by the SMF for the SUPI, which may otherwise not be known by the SMF. The AMF may provide, to the SMF, a hint regarding other DNNs (e.g., administrator DNN, gaming application DNN, low latency application DNN, and so on) that are allowed for the SUPI. The AMF may tailor the hint by having information regarding which DNNs are supported by each SMF, where such information may be received from the NRF. The hint regarding the other DNNs may be a prediction of which DNNs may be used in the future by the SMF. The AMF may be able to indicate the plurality of DNNs based on the discovery message for discovering a plurality of DNNs transmitted to the NRF, and the subsequent indication received from the NRF.

In some implementations, the AMF may transmit, to the SMF, the first PDU session message (e.g., Nsmf_PDUSession_Create SMContext, SUPI, DNN, S-NSSAI, AllowedDNN=Internet, Admin). The first PDU session message may be for establishing a first PDU session for IMS. The first PDU session message may indicate the SUPI, the DNN associated with the first PDU session message (e.g., the IMS DNN), and the S-NSSAI. The first PDU session message may indicate allowed DNNs and S-NSSAI combinations, which may be other DNNs and S-NSSAI combinations for which PDU sessions may be created in the future. The other DNNs may include an internet DNN and an administrator DNN. In other cases, the other DNNs may include other DNN types (e.g., low latency, gaming, and so on). The first PDU session message may include an Allowed DNN information element (IE) to indicate to the SMF all of the potential DNNs (e.g., potential PDU sessions) that the SMF may establish in the future.

As shown by reference number 114, the SMF may transmit, to the NRF, a discovery message for discovering the UDM/UDR that is associated with the UE. The SMF may not initially have information regarding the UDM/UDR that is to be used for the UE. Multiple UDMs/UDRs may potentially be available to be used for the UE. The discovery message may indicate the SUPI. The SMF may transmit, to the NRF, the discovery message for discovering the UDM/UDR that is associated with the UE (e.g., GET ../nnrf-disc/v./nf-instances?target-nf-type=UDM&SUPI=SUPI&group-id-list=UDM GroupId&service-names=nudm-sdm). The discovery may be a GET message. The discovery message may indicate the NRF and a target type of UDM. The discovery message may indicate the SUPI, a group identifier list, and service names.

As shown by reference number 116, the SMF may receive, from the NRF, an indication of the UDM/UDR, which may be associated with the SUPI and useable by the SMF. In other words, the UDM/UDR that is indicated may be used by the SUPI. The NRF may transmit the indication of the UDM/UDR based on the discovery message received from the SMF. The SMF may receive, from the NRF, the indication of the UDM/UDR (e.g., 200 OK), which may be associated with the SUPI and useable by the SMF. The indication may be a 200 OK message. The determination of which UDM/UDR to use may be based on the SUPI.

As shown by reference number 118, the SMF may transmit, to the UDM/UDR, a subscriber profile retrieval message for requesting session management subscription data for the plurality of DNNs. The plurality of DNNs may be supported by the SMF. The SMF may transmit the subscriber profile retrieval message based on the hint indicated in the first SMF PDU session create session context message, as received from the AMF, because the hint indicated which other DNNs and S-NSSAIs are supported by the SMF. The SMF may be able to request relevant session management subscription data based on the hint received in the first SMF PDU session create session context message. The SMF may transmit the subscriber profile retrieval message based on the indication of the UDM/UDR, as received from the NRF. The subscriber profile retrieval message may indicate the need for the session management subscription data for the plurality of DNNs.

In some implementations, the SMF may transmit, to the UDM/UDR, the subscriber profile retrieval message for requesting session management subscription data for the plurality of DNNs and S-NSSAI combinations (e.g., GET ../nudm-sdm/v./{supi}/sm-data?single-nssai=S-NSSAI&dnn=IMS&dnn=Internet&dnn=Admin). The subscriber profile retrieval message may be a GET message. The subscriber profile retrieval message may indicate the need for session management subscription data and the S-NSSAI. The subscriber profile retrieval message may indicate the IMS DNN, the internet DNN, and the administrator DNN.

In some implementations, the S-NSSAI may be associated with each individual DNN. For example, the AMF might provide a hint that the UE is allowed to use DNN internet with slice identifier (ID) 1, DNN internet with slice ID 2, DNN administrator with only slice ID 1, etc. When the SMF transmits a UDM/UDR query, the SMF may specifically request session management information for DNN internet with slice ID 1, DNN internet with slice ID 2, DNN administrator with only slice ID 1, etc.

As shown by reference number 120, the SMF may receive, from the UDM/UDR, an acknowledgement message. The acknowledgement message may indicate the session management subscription data for the plurality of DNNs, which may include session management subscription data of the IMS and session management subscription data of the internet, and which may be in response to the subscriber profile retrieval message. In other words, the SMF may prefetch the session management subscription data for the plurality of DNNs, even though the SMF may only immediately need the session management subscription data of the IMS and may not immediately need the session management subscription data of the internet DNN. The acknowledgement may also indicate the session management subscription data for other DNNs, such as the administrator DNN, the internal application DNN, the gaming DNN, the low latency application DNN, and/or the enterprise DNN.

In some implementations, the SMF may receive, from the UDM/UDR, the acknowledgement message (e.g., 200 OK—SessionManagement SubscriptionData of IMS, SessionManagement SubscriptionData of Internet, SessionManagement SubscriptionData of Admin). The acknowledgement message may indicate the session management subscription data for the plurality of DNNs, which may include the IMS DNN, the internet DNN, and the administrator DNN. During a PDU session setup for the IMS DNN, the SMF may check the Allowed DNN IE received from the AMF, and the SMF may pull the session management subscription data for the IMS DNN, as well as for the allowed DNN (e.g., internet DNN and administrator DNN), from the UDM/UDR at the same time, thereby eliminating the need to request such session management subscription data from the UDM/UDR at a later time. The SMF may locally store the session management subscription data for the IMS DNN and for the allowed DNN. The SMF may continue an IMS PDU session process.

As shown by reference number 122, the SMF may store the session management subscription data for the plurality of DNNs. The SMF may need session management subscription data for other DNNs at a later time, and instead of requesting such session management subscription data from the UDM/UDR at the later time, the SMF may preemptively store the session management subscription data for the plurality of DNNs. In some cases, the SMF may only store session management subscription data for other DNNs that may be accessed at the later time (e.g., the most common DNNs), and the SMF may not store session management subscription data for DNNs that will not be accessed at the later time.

As shown by reference number 124, the AMF may transmit, to the SMF, a second PDU session message. The second PDU session message may be for establishing a second PDU session for internet. The second PDU session, which may be associated with the internet DNN, may exist in parallel with the first PDU session, which may be associated with the IMS DNN. In other words, the first PDU session for IMS may coexist with the second PDU session for internet. The AMF may transmit, to the SMF, the second PDU session message (e.g., Nsmf_PDUSession_Create SMContext Internet PDU). The second PDU session message may be for establishing a second PDU session for internet. The second PDU session message may indicate the SUPI, the DNN associated with the second PDU session message (e.g., the internet DNN), and the S-NSSAI.

As shown by reference number 126, the SMF may establish the second PDU session for internet using the session management subscription data for the plurality of DNNs stored locally by the SMF, which may include session management subscription data of the internet. In other words, the SMF may not need to send another request to the UDM/UDR for the session management subscription data of the internet, but rather the session management subscription data of the internet may already be stored locally at the SMF because the SMF previously requested the session management subscription data for the plurality of DNNs. The SMF may refrain from pulling session management subscription data for the internet DNN, because this information may already be locally stored at the SMF. The SMF may avoid transmitting another subscriber profile retrieval message to the UDM/UDR, and the SMF may avoid receiving another acknowledgement message from the UDM/UDR. The SMF may continue the IMS PDU session process.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
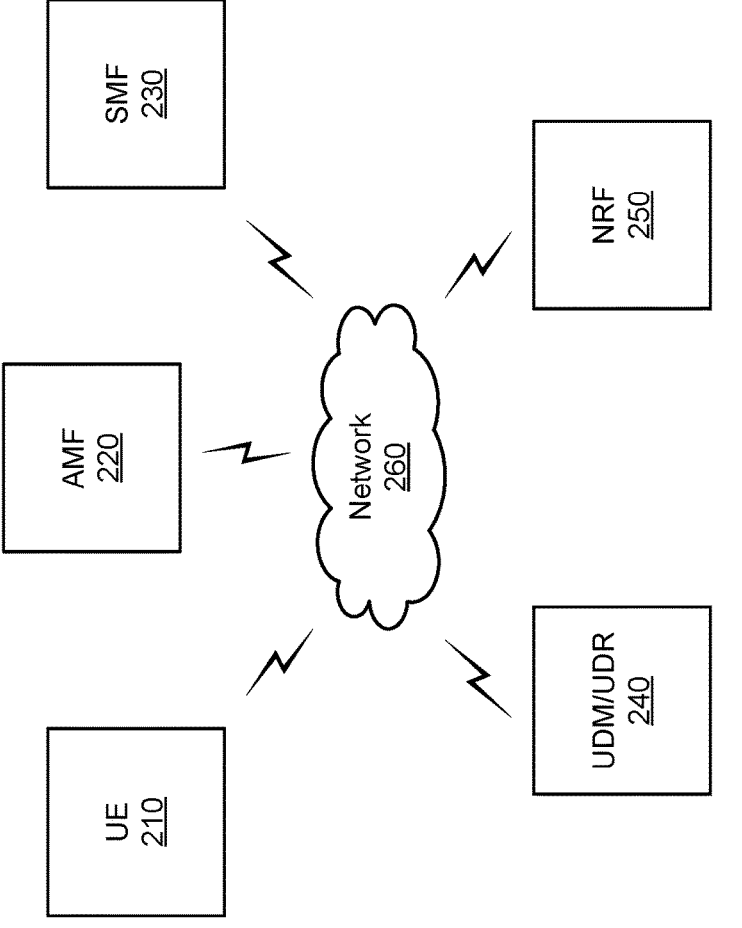
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a UE 210, an AMF 220, an SMF 230, a UDM/UDR 240, an NRF 250, and a network 260. Devices of environment 200 may interconnect via wired connections, wireless connections, or a combination of wired and wireless connections.

The UE 210 may include one or more devices capable of receiving, generating, storing, processing, and/or providing information associated with establishing PDU sessions using session management subscription data, as described elsewhere herein. The UE 210 may include a communication device and/or a computing device. For example, the UE 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The AMF 220 may include one or more devices capable of receiving, processing, storing, routing, and/or providing information in a manner described herein. The AMF 220 may include a router, a gateway, a switch, a firewall, a hub, a bridge, a reverse proxy, a server (e.g., a proxy server, a cloud server, or a data center server), a load balancer, and/or a similar device. In some implementations, the AMF 220 may be a physical device implemented within a housing, such as a chassis. In some implementations, the AMF 220 may be a virtual device implemented by one or more computing devices of a cloud computing environment or a data center. In some implementations, a group of AMFs 220 may be a group of data center nodes that are used to route traffic flow through a network.

The SMF 230 may include one or more devices capable of receiving, processing, storing, routing, and/or providing information in a manner described herein. The SMF 230 may include a router, a gateway, a switch, a firewall, a hub, a bridge, a reverse proxy, a server (e.g., a proxy server, a cloud server, or a data center server), a load balancer, and/or a similar device. In some implementations, the SMF 230 may be a physical device implemented within a housing, such as a chassis. In some implementations, the SMF 230 may be a virtual device implemented by one or more computing devices of a cloud computing environment or a data center. In some implementations, a group of SMF 230 may be a group of data center nodes that are used to route traffic flow through a network.

The UDM/UDR 240 may include one or more devices capable of receiving, processing, storing, routing, and/or providing information in a manner described herein. The UDM/UDR 240 may include a router, a gateway, a switch, a firewall, a hub, a bridge, a reverse proxy, a server (e.g., a proxy server, a cloud server, or a data center server), a load balancer, and/or a similar device. In some implementations, the UDM/UDR 240 may be a physical device implemented within a housing, such as a chassis. In some implementations, the UDM/UDR 240 may be a virtual device implemented by one or more computing devices of a cloud computing environment or a data center. In some implementations, a group of UDMs/UDRs 240 may be a group of data center nodes that are used to route traffic flow through a network.

The NRF 250 may include one or more devices capable of receiving, processing, storing, routing, and/or providing information in a manner described herein. The NRF 250 may include a router, a gateway, a switch, a firewall, a hub, a bridge, a reverse proxy, a server (e.g., a proxy server, a cloud server, or a data center server), a load balancer, and/or a similar device. In some implementations, the NRF 250 may be a physical device implemented within a housing, such as a chassis. In some implementations, the NRF 250 may be a virtual device implemented by one or more computing devices of a cloud computing environment or a data center. In some implementations, a group of NRFs 250 may be a group of data center nodes that are used to route traffic flow through a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
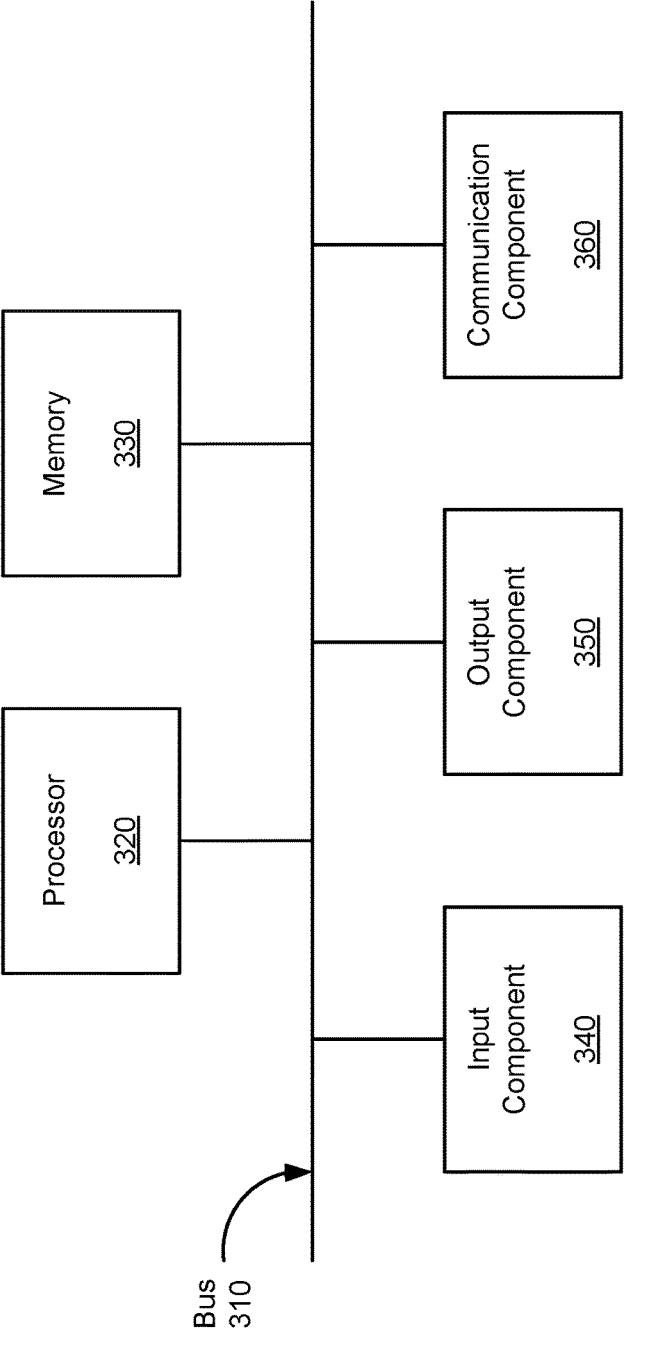
FIG. 3 is a diagram of example components of one or more devices of FIG. 3.

FIG. 3 is a diagram of example components of a device 300 associated with establishing PDU sessions using session management subscription data. The device 300 may correspond to UE 210, AMF 220, SMF 230, UDM/UDR 240, and/or NRF 250. In some implementations, UE 210, AMF 220, SMF 230, UDM/UDR 240, and/or NRF 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with establishing PDU sessions using session management subscription data. In some implementations, one or more process blocks of FIG. 4 may be performed by an SMF (e.g., SMF 230). In some implementations, one or more process blocks of FIG. 4 may be performed by another device or a group of devices separate from or including the SMF, such as UE 210, AMF 220, UDM/UDR 240, and/or NRF 250. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, by an SMF from an AMF, a PDU session message that indicates a plurality of DNNs capable of being handled by the SMF for a SUPI (block 410). For example, the SMF may receive, from the AMF, a PDU session message that indicates a plurality of DNNs capable of being handled by the SMF for a SUPI, as described above. In some implementations, the plurality of DNNs includes an IMS DNN and an internet DNN. In some implementations, the plurality of DNNs includes one or more of an administrator DNN, an internal application DNN, a gaming DNN, a low latency application DNN, or an enterprise DNN.

As further shown in FIG. 4, process 400 may include transmitting, by the SMF to a UDM/UDR, a subscriber profile retrieval message for requesting session management subscription data for the plurality of DNNs (block 420). For example, the SMF may transmit, to the UDM/UDR, a subscriber profile retrieval message for requesting session management subscription data for the plurality of DNNs, as described above. In some implementations, the subscriber profile retrieval message for requesting the session management subscription data is for the plurality of DNNs and one or more S-NSSAIs. The S-NSSAI may apply to individual DNN(s).

As further shown in FIG. 4, process 400 may include receiving, by the SMF and from the UDM/UDR, an acknowledgement message that indicates the session management subscription data for the plurality of DNNs (block 430). For example, the SMF may receive, from the UDM/UDR, an acknowledgement message that indicates the session management subscription data for the plurality of DNNs, as described above.

As further shown in FIG. 4, process 400 may include storing, by the SMF, the session management subscription data for the plurality of DNNs, wherein the session management subscription data is stored for future PDU sessions associated with one or more DNNs of the plurality of DNNs (block 440). For example, the SMF may store the session management subscription data for the plurality of DNNs, wherein the session management subscription data is stored for future PDU sessions associated with one or more DNNs of the plurality of DNNs, as described above.

In some implementations, the PDU session message is a first PDU session message for establishing a first PDU session for IMS. In some implementations, process 400 includes receiving, by the SMF from the AMF, a second PDU session message for establishing a second PDU session for internet, and establishing, by the SMF, the second PDU session for internet using the session management subscription data for the plurality of DNNs stored locally by the SMF.

In some implementations, process 400 includes transmitting, by the SMF to an NRF, a discovery message for discovering the UDM or the UDR that is associated with the UE, and receiving, by the SMF and from the NRF, an indication of the UDM or the UDR, wherein the subscriber profile retrieval message is transmitted based on the indication received from the NRF.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with establishing PDU sessions using session management subscription data. In some implementations, one or more process blocks of FIG. 5 may be performed by an AMF (e.g., AMF 220). In some implementations, one or more process blocks of FIG. 5 may be performed by another device or a group of devices separate from or including the AMF, such as UE 210, SMF 230, UDM/UDR 240, and/or NRF 250. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include transmitting, by an AMF to an NRF, a discovery message for discovering a plurality of DNNs capable of being handled by a session management function (SMF) (block 510). For example, the AMF may transmit, to the NRF, a discovery message for discovering a plurality of DNNs capable of being handled by an SMF, as described above. In some implementations, the plurality of DNNs includes an IMS DNN and an internet DNN. In some implementations, the plurality of DNNs includes one or more of an administrator DNN, an internal application DNN, a gaming DNN, a low latency application DNN, or an enterprise DNN.

As further shown in FIG. 5, process 500 may include receiving, by the AMF and from the NRF, an indication of the plurality of DNNs capable of being handled by the SMF (block 520). For example, the AMF may receive, from the NRF, an indication of the plurality of DNNs capable of being handled by the SMF, as described above.

As further shown in FIG. 5, process 500 may include transmitting, by the AMF to the SMF, a PDU session message that indicates the plurality of DNNs capable of being handled by the SMF (block 530). For example, the AMF may transmit, to the SMF, a PDU session message that indicates the plurality of DNNs capable of being handled by the SMF, as described above.

In some implementations, process 500 includes receiving, by the AMF and from a UE, a PDU session establishment request that indicates a DNN and S-NSSAI. In some implementations, process 500 includes transmitting, by the AMF to a UDM/UDR, a request for SMF selection subscription data for a SUPI, and receiving by the AMF and from the UDM/UDR, an indication of the SMF selection subscription data, wherein the indication includes one or more S-NSSAIs and corresponding DNNs.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a session management function (SMF) from an access and mobility management function (AMF), a protocol data unit (PDU) session message, wherein the PDU session message indicates a plurality of data network names (DNNs) capable of being handled by the SMF for a subscription permanent identifier (SUPI);
transmitting, by the SMF to a unified data management (UDM) or a unified data repository (UDR), a subscriber profile retrieval message, wherein the subscriber profile retrieval message comprises an indication for requesting session management subscription data for the plurality of DNNs;
receiving, by the SMF and from the UDM or the UDR, an acknowledgement message, wherein the acknowledgement message indicates the session management subscription data for the plurality of DNNs, wherein the acknowledgement message is received in response to the subscriber profile retrieval message; and
storing, by the SMF, the session management subscription data for the plurality of DNNs, wherein the session management subscription data is stored for future PDU sessions associated with one or more DNNs of the plurality of DNNs.

2. The method of claim 1,
wherein the PDU session message is a first PDU session message for establishing a first PDU session for internet protocol multimedia subsystem (IMS).

3. The method of claim 2, further comprising:
receiving, by the SMF and from the AMF, a second PDU session message for establishing a second PDU session for internet; and
establishing, by the SMF, the second PDU session for internet using the session management subscription data for the plurality of DNNs stored locally by the SMF.

4. The method of claim 1,
wherein the plurality of DNNs includes an internet protocol multimedia subsystem (IMS) DNN and an internet DNN.

5. The method of claim 1,
wherein the plurality of DNNs includes one or more of: an administrator DNN, an internal application DNN, a gaming DNN, a low latency application DNN, or an enterprise DNN.

6. The method of claim 1,
wherein the subscriber profile retrieval message is for the plurality of DNNs and one or more single-network slice selection assistance information (S-NSSAIs).

7. The method of claim 1, further comprising:
transmitting, by the SMF to a network repository function (NRF), a discovery message comprising an indication for discovering the UDM or the UDR that is associated with a user equipment (UE); and
receiving, by the SMF and from the NRF, an indication of the UDM or the UDR, wherein the subscriber profile retrieval message is transmitted based on the indication of the UDM or the UDR received from the NRF.

8. A device, comprising:
one or more processors configured to:
receive, from an access and mobility management function (AMF), a protocol data unit (PDU) session message, wherein the PDU session message indicates a plurality of data network names (DNNs) capable of being handled by a session management function (SMF) for a subscription permanent identifier (SUPI);
transmit, to a unified data management (UDM) or a unified data repository (UDR), a subscriber profile retrieval message, wherein the subscriber profile retrieval message comprises an indication for requesting session management subscription data for the plurality of DNNs; and
receive, from the UDM or the UDR, an acknowledgement message, wherein the acknowledgement message indicates the session management subscription data for the plurality of DNNs, wherein the acknowledgement message is received in response to the subscriber profile retrieval message.

9. The device of claim 8,
wherein the PDU session message is a first PDU session message for establishing a first PDU session for internet protocol multimedia subsystem (IMS).

10. The device of claim 9,
wherein one or more processors are configured to:
receive, from the AMF, a second PDU session message for establishing a second PDU session for internet; and
establish the second PDU session for internet using the session management subscription data for the plurality of DNNs.

11. The device of claim 8,
wherein the plurality of DNNs includes one or more of: an internet protocol multimedia subsystem (IMS) DNN, an internet DNN, an administrator DNN, an internal application DNN, a gaming DNN, a low latency application DNN, or an enterprise DNN.

12. The device of claim 8,
wherein the subscriber profile retrieval message is for the plurality of DNNs and one or more single-network slice selection assistance information (S-NSSAIs).

13. The device of claim 8,
wherein one or more processors are configured to:
transmit, to a network repository function (NRF), a discovery message comprising an indication for discovering the UDM or the UDR that is associated with a user equipment (UE); and
receive, from the NRF, an indication of the UDM or the UDR, wherein the subscriber profile retrieval message is transmitted based on the indication of the UDM or the UDR received from the NRF.

14. A non-transitory computer-readable medium storing a set of instructions, the set of instructions comprising:
one or more instructions that, when executed by one or more processors of a device, cause the device to:

receive, by the device from an access and mobility management function (AMF), a protocol data unit (PDU) session message, wherein the PDU session message indicates a plurality of data network names (DNNs) capable of being handled by the device for a subscription permanent identifier (SUPI);

transmit, by the device to a unified data management (UDM) or a unified data repository (UDR), a subscriber profile retrieval message, wherein the subscriber profile retrieval message comprises an indication for requesting session management subscription data for the plurality of DNNs;

receive, by the device and from the UDM or the UDR, an acknowledgement message, wherein the acknowledgement message indicates the session management subscription data for the plurality of DNNs, wherein the acknowledgement message is received in response to the subscriber profile retrieval message; and store, by the device, the session management subscription data for the plurality of DNNs, wherein the session management subscription data is stored for future PDU sessions associated with one or more DNNs of the plurality of DNNs.

15. The non-transitory computer-readable medium of claim 14, wherein the PDU session message is a first PDU session message for establishing a first PDU session for internet protocol multimedia subsystem (IMS).

16. The non-transitory computer-readable medium of claim 15, wherein the one or more instructions further cause the device to:

receive, by the device and from the AMF, a second PDU session message for establishing a second PDU session for internet; and establish, by the device, the second PDU session for internet using the session management subscription data for the plurality of DNNs stored locally by the device.

17. The non-transitory computer-readable medium of claim 14, wherein the plurality of DNNs includes an internet protocol multimedia subsystem (IMS) DNN and an internet DNN.

18. The non-transitory computer-readable medium of claim 14, wherein the plurality of DNNs includes one or more of: an administrator DNN, an internal application DNN, a gaming DNN, a low latency application DNN, or an enterprise DNN.

19. The non-transitory computer-readable medium of claim 14, wherein the subscriber profile retrieval message is for the plurality of DNNs and one or more single-network slice selection assistance information (S-NSSAIs).

20. The non-transitory computer-readable medium of claim 14, wherein the one or more instructions further cause the device to:

transmit, by the device to a network repository function (NRF), a discovery message comprising an indication for discovering the UDM or the UDR that is associated with a user equipment (UE); and receive, by the device and from the NRF, an indication of the UDM or the UDR, wherein the subscriber profile retrieval message is transmitted based on the indication of the UDM or the UDR received from the NRF.

* * * * *